UNITED STATES PATENT OFFICE.

CHARLES L. GEBAUER, OF CLEVELAND, OHIO.

PROCESS OF PRODUCING METAL BODIES.

1,223,322.  Specification of Letters Patent.  Patented Apr. 17, 1917.

No Drawing.  Application filed April 12, 1916.  Serial No. 90,585.

*To all whom it may concern:*

Be it known that I, CHARLES L. GEBAUER, a citizen of the United States, residing at Cleveland, in the county of Cuyahoga and State of Ohio, have invented a certain new and useful Improvement in Processes of Producing Metal Bodies, of which the following is a full, clear, and exact description, reference being had to the accompanying drawings.

This invention relates to a new composition of matter and process of making same, this composition of matter consisting of a metallic substance of peculiar and valuable properties. The essence of my invention consists in this that a plurality of different metals, being first reduced to a finely powdered or preferably colloidal form, are mixed together in the desired proportions and molded into the shape and size desired under very great pressure, as by a hydraulic or other press whereby they are compacted into such a rigid condition as to withstand ordinary handling, and so as not to change shape or size during subsequent manipulations. This compact material is then subjected to an accurately predetermined degree of heat in an electric or other furnace to the end that the component metals shall be integrally welded together while preserving their non-homogeneous character, with the result that the finished product has the physical properties of the component elements and not a different set of physical properties as would be the case with an alloy.

I do not limit myself to the use of any particular metal, or of any particular combination or combinations of metals, since I have found some combinations peculiarly adapted for some uses and others for different uses. By suitably choosing and proportioning the ingredients it is possible to produce a composition of any desired hardness, tensile strength, rigidity, elasticity, coefficient of expansion, resistance, coefficient of resistance, or other qualities within certain limits fixed by the possible range of materials. I am aware that this process may be applied to mixtures of the following metals: gold, silver, copper, iron, aluminum, nickel, platinum, tungsten, tellurium, iridium, osmium, molybdenum. I apprehend that the same process may in some instances or under some conditions be employed with tin, lead, zinc, bismuth, antimony and the other baser metals, although not with the same freedom and impunity as with the more noble metals. In general, the described process appears to be applicable to all metals which can be reduced to colloidal or other finely divided form at ordinary temperatures, although care must be taken that the metals used should not be such as possess sufficient affinity to tend to dissolve each other. Thus, lead should not be used with tin, zinc, bismuth, antimony, gold, silver, or platinum, since it would begin to dissolve the other constituents as soon as it was itself melted and thus produce an alloy instead of the peculiar composition herein described. Other combinations must similarly be guarded against as will be obvious to any chemist or metallurgist. Ordinarily the temperature employed in the last operation will be such as to fuse only one constituent which will thereupon embrace and adhere tenaciously to the other constituents, although my invention will extend to the condition in which any number of the constituents less than the whole number shall be fused or sintered, or in which the temperature shall merely serve to weld the ingredients together without the fusion of any.

The composition of matter resulting from this process may be pressed or stamped into the form of sheets, plates, rods, balls, buttons, cylinders, or other simple forms, or may be shaped by using suitable molds into complicated and mechanical elements which subsequently may be solidified by the heating operation to fit them for any desired commercial use; this in a measure takes the place of casting. Also the rods or cylinders mentioned may be swaged, rolled or drawn into the form of longer rods or wire, the sheets may be rolled, hammered or otherwise formed into plates, and parts may be welded, soldered, or otherwise connected to other parts of the same or different composition and in general, the same mechanical processes may be employed as upon any simple metal or alloy provided only that the metal be not subjected to any temperature higher than that of its creation. Thus, I am enabled to produce anodes for vacuum tubes of the types illustrated and described in the patent of T. H. Gebauer, No. 1,131,606, dated March 9, 1915, which shall have a smaller degree of porosity than is possessed by tungsten as ordinarily produced, and hence less liable to absorb the molten copper or to occlude gases. This object I can obtain in a very satisfactory manner by means of a mixture of tungsten, 95%, platinum, 5% treated as above described, though these proportions are not invariable by any means.

Other combinations and uses which occur to me are: tungsten with gold, silver or platinum for interrupters or other electrical contacts; manganese with copper, nickel or silver for electrical resistances; platinum with iridium, osmium or other refractory metals for pyrometers; aluminum with iron, copper, nickel, or manganese for structural uses as in aviation apparatus, and different compositions for purposes of every sort which necessitate any peculiar condition of material.

The pressure employed is preferably extremely high and the mechanism for producing this pressure will be selected with reference to the size of the article. Thus for small balls, electrical contacts, etc., a punch press is sufficient, but with larger articles a more powerful appliance is generally required, such as a hydraulic press.

While I have described my invention in detail and pointed out certain compositions which I conceive to have certain value for specific uses, I do not restrict myself to those compositions or to those uses, since I esteem my invention to be of a larger breadth, namely the production of a new type of material combined in a new way and producing new results, regardless of the particular elements employed in the making of that material which will be chosen in view of the particular qualities desired.

Having thus described my invention, what I claim is:—

1. The process of producing formed metal articles which consists of molding finely disintegrated metallic constituents to the desired form under great pressure, and thereafter welding said constituents together by application of a degree of heat less than required to fuse the most refractory constituent.

2. The process of producing formed metal articles which consists of molding into the desired form under great pressure a mixture of finely divided metals of varying melting points and subsequently subjecting the mixture to a temperature intermediate the melting points of the constituent metals.

3. The process of producing metal bodies which consists of compressing into the desired form an intimate mixture of finely disintegrated metals, and subjecting said mixture to a temperature above the softening point of the least refractory metal and lower than the melting point of the remaining metals.

In testimony whereof, I hereunto affix my signature.

CHARLES L. GEBAUER.